US011887831B2

(12) United States Patent
Bedford et al.

(10) Patent No.: US 11,887,831 B2
(45) Date of Patent: Jan. 30, 2024

(54) AUTOMATED ION OPTICS CHARGING COMPENSATION

(71) Applicant: DH Technologies Development Pte. Ltd., Singapore (SG)

(72) Inventors: Leigh Bedford, Ajax (CA); Yang Kang, Richmond Hill (CA); Yves Le Blanc, Newmarket (CA); Bradley Schneider, Bradford (CA)

(73) Assignee: DH Technologies Development Pte. Ltd., Singapore (SG)

( * ) Notice: Subject to any disclaimer, the term of this patent is extended or adjusted under 35 U.S.C. 154(b) by 255 days.

(21) Appl. No.: 17/312,695

(22) PCT Filed: Dec. 12, 2019

(86) PCT No.: PCT/IB2019/060728
§ 371 (c)(1),
(2) Date: Jun. 10, 2021

(87) PCT Pub. No.: WO2020/121256
PCT Pub. Date: Jun. 18, 2020

(65) Prior Publication Data

US 2022/0059334 A1 Feb. 24, 2022

Related U.S. Application Data

(60) Provisional application No. 62/779,301, filed on Dec. 13, 2018.

(51) Int. Cl.
*H01J 49/06* (2006.01)
*H01J 49/00* (2006.01)
*H01J 49/42* (2006.01)

(52) U.S. Cl.
CPC ........ *H01J 49/067* (2013.01); *H01J 49/0031* (2013.01); *H01J 49/4215* (2013.01)

(58) Field of Classification Search
CPC .... H01J 49/006; H01J 49/0009; H01J 49/025; H01J 49/063; H01J 49/067;
(Continued)

(56) References Cited

U.S. PATENT DOCUMENTS

| | | | | |
|---|---|---|---|---|
| 5,652,427 A * | 7/1997 | Whitehouse | ........ | H01J 49/0481 250/288 |
| 2018/0286647 A1* | 10/2018 | Guckenberger | ...... | H01J 49/147 |

FOREIGN PATENT DOCUMENTS

| | | |
|---|---|---|
| EP | 3038133 A1 | 6/2016 |
| EP | 3382738 A1 | 10/2018 |

(Continued)

OTHER PUBLICATIONS

Tang K et al: "Charge competition and the linear dynamic range of detection in electrospray ionization mass spectrometry", Journal of the American Society for Mass Spectrometry, Elsevier Science Inc, US, vol. 15, No. 10, Oct. 1, 2004 (Oct. 1, 2004), pp. 1416-1423 XP004588886, ISSN: 1044-0305, D0I: 10.1016/J.JASMS.2004.04.034 abstract Section "Experimental" on pp. 1417-1418.

(Continued)

*Primary Examiner* — David E Smith
*Assistant Examiner* — Hsien C Tsai

(57) ABSTRACT

In some embodiments, a method for optimizing performance of a mass spectrometer comprises using an ion source to generate ions, collisionally cooling the ions within an ion guide, directing said ions from the ion guide through at least one ion lens to a downstream mass analyzer, ramping a DC voltage applied to the ion lens, performing a mass analysis of the ions within the mass analyzer while the DC voltage applied to the ion lens is ramped, estimating performance of the mass spectrometer by measuring one or more characteristics of at least one of an ion signal and the voltage ramp, and adjusting a DC voltage applied to said at least one lens element based on said measured one or more characteristics (Continued)

of at least one of the ion signal and the voltage ramp so as to enhance performance of the mass spectrometer.

17 Claims, 15 Drawing Sheets

(58) Field of Classification Search
CPC .. H01J 49/0031; H01J 49/147; H01J 49/0481; H01J 49/4205; H01J 49/4215
See application file for complete search history.

(56) References Cited

FOREIGN PATENT DOCUMENTS

| | | | |
|---|---|---|---|
| WO | 20190167026 | A1 | 9/2019 |
| WO | 20190229449 | A1 | 12/2019 |

OTHER PUBLICATIONS

International Search Report and Written Opinion for PCT/IB2019/060728 dated Apr. 3, 2020.

* cited by examiner

1315

800

AUTOMATED ION OPTICS CHARGING COMPENSATION

RELATED APPLICATION

This application claims priority to U.S. provisional application No. 62/779,301 filed on Dec. 13, 2018, entitled "Automated Ion Optics Charging Compensation," which is incorporated herein by reference in its entirety.

BACKGROUND

The present teachings relate generally to methods and systems for monitoring and optimizing the performance of mass spectrometers, such as quadrupole and time-of-flight mass spectrometers.

Mass spectrometry (MS) is an analytical technique for measuring mass-to-charge ratios of molecules, with both qualitative and quantitative applications. MS can be useful for identifying unknown compounds, determining the structure of a particular compound by observing its fragmentation, and quantifying the amount of a particular compound in a sample. Mass spectrometers detect chemical entities as ions such that a conversion of the analytes to charged ions must occur during sample processing.

A variety of mass spectrometers are known in the art, such as quadrupole and time-of-flight mass spectrometers. The performance of a quadrupole mass spectrometer tends to degrade over time when exposed to high levels of ion current. A principal contributor to the degradation of mass analysis performance is charged debris deposited on various surfaces of the spectrometer. For example, in some cases, an effective transmission of ions is impeded by the accumulation of charged debris occurring over time on critical lens elements that operated at low potential difference. The buildup of debris on these surfaces can cause the effective potential to adversely affect the transmission of ions along the ion path. Frequently, this effect manifests itself as loss in performance over time, which can significantly reduce ion signals and lead to poor sensitivity. Such loss in performance can become so severe as to require cleaning of the instrument to restore an acceptable performance level. In some cases, such cleaning of the instrument may become necessary over the course of an analysis run, which can lead to significant downtime and loss of samples.

Accordingly, there is a need for systems and methods for monitoring and optimizing performance of mass spectrometers.

SUMMARY

In one aspect, a method of optimizing performance of a mass spectrometer is disclosed, which comprises generating a mass spectrum of a sample, estimating performance of the mass spectrometer by measuring one or more characteristics of the mass spectrum, and adjusting at least one voltage applied to at least one component of the mass spectrometer based on said measured one or more characteristics so as to enhance performance of the mass spectrometer.

In some embodiments, a method for optimizing performance of a mass spectrometer comprises using an ion source to generate ions, collisionally cooling the ions within an ion guide, directing said ions from the ion guide through at least one ion lens to a downstream mass analyzer, ramping a DC voltage applied to the ion lens, performing a mass analysis of the ions within the mass analyzer while the DC voltage applied to the ion lens is ramped, estimating performance of the mass spectrometer by measuring one or more characteristics of at least one of an ion signal and the voltage ramp, and adjusting a DC voltage applied to said at least one lens element based on said measured one or more characteristics of at least one of the ion signal and the voltage ramp so as to enhance performance of the mass spectrometer.

In some embodiments, the measured characteristic is a characteristic other than a resolution of the mass analyzer.

In some embodiments, the measured characteristic of the ion signal comprises an intensity of the ion signal, e.g., an intensity of a mass peak in a mass spectrum. By way of example, in some embodiments, the characteristic of the ion signal can be the intensity of an MRM transition.

In some embodiments, the measured characteristic of the voltage ramp can be the ratio of an ion intensity at two voltages along the voltage ramp.

In some embodiments, a fixed DC voltage offset is applied between the mass analyzer and the ion guide so as to maintain a fixed ion energy for ions entering the mass analyzer.

In some embodiments, the voltage can be ramped over about 50 volt increment.

In some embodiments, the mass spectrometer can be a quadrupole mass spectrometer. In some embodiments, the mass spectrometer can be a hybrid quadrupole-time-of-flight mass spectrometer.

While in some embodiments, a single characteristic may be monitored and employed to optimize the performance of a mass spectrometer, in other embodiments, a combination of two or more characteristics can be employed. In some such embodiments in which a combination of two or more characteristics are employed, weighting factors may be assigned to those characteristics to obtain a measure of the performance of the mass spectrometer. Further, the characteristic employed to assess the performance of the mass spectrometer can be a characteristic other than a mass resolution exhibited by the mass spectrometer.

The measured characteristics of the ion signal and/or the voltage ramp can be analyzed to determine whether an adjustment of one or more voltages applied to one or more components of the mass spectrometer, e.g., one or more lenses of the mass spectrometer, is required. By way of example, if the intensity of a mass peak is lower than a predefined value, the voltage(s) applied to the components can be adjusted.

By way of example, the mass spectrometer can comprise a quadrupole mass spectrometer having an ion guide configured for receiving ions from an ion source, a downstream mass filter and a lens positioned between the ion guide and the mass filter. In some such embodiments, a sample, e.g., a sample eluted through an LC (liquid chromatography) column, can be introduced into an ion source to generate a plurality of ions, and the ions can be passed through the mass filter to select ions at a desired m/z ratio or ions within an m/z window, and the ions can then be detected by a downstream detector to generate a mass spectrum. At least one characteristic of a mass peak within the spectrum, e.g., its intensity and/or an ion signal intensity change as a function of ramp voltage, can be determined.

In some such embodiments, the measured characteristic can be compared with a predefined value, e.g., a value obtained from a baseline spectrum, to determine whether adjustment of a voltage applied to the lens is required. If the comparison shows that an adjustment is required, the voltage applied to the lens can be ramped and the measured characteristic can be monitored at different voltages to determine an optimal voltage for application to the lens. For example, the optimal voltage can be a voltage at which the peak intensity is maximized. In some embodiments, the comparison of the measured characteristic with the baseline value may indicate that cleaning of the mass spectrometer is required.

In some embodiments, the performance of the mass spectrometer is monitored periodically, e.g., based on a predefined schedule.

In a related aspect, a mass spectrometer is disclosed, which comprises a source for generating ions, an ion guide for receiving ions from said ion source, a mass filter positioned downstream of said ion guide, and an ion lens that is disposed between said ion guide and said mass filter. The mass spectrometer can further include a voltage source for applying a DC voltage to the ion lens and a detector disposed downstream of the mass filter for detecting ions to generate mass detection signals. A controller is in communication with the detector for receiving the mass detection signals from the detector and generating one or more ion intensity signals associated with the ions detected by the detector. The controller is further configured to extract one or more characteristics associated with the ion signal and/or the voltage ramp, such as those discussed above. The controller can be in communication with the DC voltage source for adjusting the DC voltage applied to the lens based on said one or more characteristics.

In some embodiments, the controller can be configured to cause the voltage source to ramp the DC voltage applied to the lens and to monitor said one or more characteristics as the voltage is ramped so as to identify an optimal DC voltage for application to said lens. In other embodiments, the one or more characteristics may include the shape of a voltage ramp curve obtained while ramping the DC voltage applied to the lens. The one or more characteristics may also include the voltage that provides the optimal signal for a given compound monitored by the downstream mass analyzer, e.g., the signal obtained when the instrument is not contaminated. In some embodiments, the characteristic may include a ratio of two ion intensities at two voltages along a voltage ramp. By way of example, in some such embodiments, the intensity of an MRM transition can be monitored as a voltage ramp is applied to a lens element, and the ratio of the intensity of the MRM transition at two voltage points can be used to evaluate the performance of the lens element.

In some embodiments, the mass filter can include a quadrupole filter. Further, in some embodiments, a collision cell is disposed between the mass filter and the detector. In some cases, the collision cell can include a set of rods arranged in a quadrupole arrangement to which RF/DC voltages can be applied for confining ions within the collision cell. In other embodiments, the collision cell or ion guide may be a higher order multipole, such as a hexapole, an octapole, a decapole, or a dodecapole. Further, in some embodiments, the collision cell or ion guide can also include ring electrodes rather than rods.

In a related aspect, a mass spectrometer is disclosed, which comprises a source for generating ions, an ion guide for receiving ions from said ion source and collisionally cooling the ions to low eV translational energy (e.g., using the methods and systems disclosed in Douglas D J, French J B, "Collisional Focusing Effects in Radio Frequency Quadrupoles", J. Am. Soc. Mass Spectrom., 1992, 3, 398-408), a mass filter positioned downstream of said ion guide, and an ion lens and/or a short quadrupole prefilter disposed between said ion guide and said mass filter. The mass spectrometer can further include voltage sources for applying DC potentials to the ion guide, lens, prefilter, and mass filter. The mass spectrometer can also include a detector positioned downstream of the mass filter for detecting ions to generate mass detection signals. An analyzer is in communication with the detector for receiving the mass detection signals from the detector and generating mass ion signals for the ions detected by the detector. In some embodiments, the mass filter can be fixed at a single m/z value so that the analyzer receives intensity information for a single m/z value. In some embodiments, the mass filter can be fixed at multiple m/z values so that the analyzer receives intensity information for multiple m/z values. The ion energy for a given ion of interest or multiple ions of interest can be fixed, by providing a fixed potential difference between the ion guide and the quadrupole analyzer, and the analyzer can be in communication with a controller, which is in turn in communication with the DC voltage source for adjusting the DC voltage applied to either the lens or the prefilter while monitoring the signal intensity for a given ion or ions of interest. In this case, the one or more characteristics can be, for example, the signal intensity profile for an ion or ions of interest as a result of a DC voltage ramp applied to the lens or prefilter. Additionally, the one or more characteristics may include the DC potential that provides the highest signal during the voltage ramp, or the ratio of an ion intensity signal at two or more voltage points along the voltage ramp.

In some embodiments, the mass spectrometer can be a triple quadrupole mass spectrometer, which includes an additional mass analyzer located after the collision cell. For these embodiments, an additional lens or prefilter may be included between the collision cell and the second mass analyzing quadrupole. In such embodiments, the mass spectrometer may also include additional voltage sources for these lenses or prefilters. The one or more characteristics may include the shape of a DC voltage ramp for these lenses or prefilters where ion intensity is monitored using the second mass analyzing quadrupole.

In a related aspect, a mass spectrometer is disclosed, which includes at least one ion source for generating ions, and an ion guide for collisionally cooling the ions. At least one mass analyzer is positioned downstream of the ion guide for performing mass analysis on the collisionally cooled ions. Further, at least one lens element is located between the ion guide and the mass analyzer. The mass spectrometer further includes at least one DC voltage source for applying a DC voltage to the lens element and a controller in communication with the voltage source for ramping a DC voltage applied to the lens element. A detector positioned downstream of the mass analyzer detects ions passing through the mass analyzer and generates mass detection signals. The mass spectrometer further includes an analyzer that is in communication with the detector for receiving the mass detection signals from the detector and generating mass ion signals (e.g., ion signals at one or more m/z values) for the ions detected by the detector. The analyzer is further configured to extract one or more characteristics of at least one of the mass ion signal and the voltage ramp. The analyzer is in further communication with the controller to provide control signals thereto for adjusting a DC voltage applied to the lens element based on said one or more characteristics.

In some embodiments, the characteristic of the ion signal can be the intensity of the signal. Further, in some embodiments, the characteristic of the voltage ramp can be the ratio of ion intensities at two voltages along the voltage ramp. In some embodiments, the mass spectrometer can include a time-of-flight mass spectrometer. The time-of-flight mass spectrometer can include a source for generating ions, an ion guide for receiving ions from said ion source and collisionally cooling the ions to low eV translational energy (as has been described previously in Douglas D J, French J B, "Collisional Focusing Effects in Radio Frequency Quadrupoles", J. Am. Soc. Mass Spectrom., 1992, 3, 398-408), a quadrupole mass filter positioned downstream of said ion guide, and an ion lens and/or a short quadrupole prefilter disposed between said ion guide and said mass filter. The mass spectrometer can further include voltage sources for applying DC potentials to the ion guide, lens, prefilter, and mass filter. The mass spectrometer can also include a detector downstream of the mass filter for detecting ions to generate mass detection signals. An analyzer is in communication with the detector for receiving the mass detection signals from the detector and generating a mass spectrum of the ions detected by the detector. In some embodiments, the mass filter can be fixed at a single m/z value so that the controller receives intensity information for a single m/z value. In some embodiments, the mass filter can be fixed at multiple m/z values so that the analyzer receives intensity information for multiple m/z values. The ion energy for a given ion or multiple ions of interest can be fixed, by providing a fixed potential difference between the ion guide and the quadrupole analyzer, and the analyzer can be in communication with a controller, which can be in turn in communication with the DC voltage source for adjusting the DC voltage applied to either the lens or the prefilter while monitoring the signal intensity for a given ion or ions of interest. In this case, the one or more characteristics of the mass spectrum can be the signal intensity profile for an ion of interest as a result of a DC voltage ramp applied to the lens or prefilter. Additionally, the one or more characteristics may include the DC potential that provides the highest signal during the voltage ramp. In some embodiments the time-of-flight mass spectrometer can include a collision cell downstream of the quadrupole mass filter for fragmenting and collisionally cooling ions, a time-of-flight analyzer downstream of the collision cell and one or more lens elements located between the collision cell and time-of-flight analyzer. The lens elements may include one or more lenses or steering elements that operate with DC potentials applied to them. The mass spectrometer further includes at least one DC voltage source applying DC potentials to the lens elements and a controller in communication with the voltage source for ramping the DC voltage applied to the one or more lens elements. A detector positioned downstream of the time-of-flight analyzer detects ions and generates mass detection signals. The mass spectrometer further includes an analyzer that is in communication with the detector for receiving the mass detection signals from the detector and generating signals for the ions detected by the detector. The analyzer is further configured to extract one or more characteristics of at least one of the ion signal intensity or voltage ramp shape. The analyzer is in further communication with the controller to provide control signals thereto for adjusting a DC voltage applied to at least one of the lens elements based on said one or more characteristics.

In a related aspect, a method is disclosed which involves periodically monitoring the performance of a quadrupole mass analyzer by monitoring the signal for a standard compound. The standard may be provided and ionized using any means known in the art. For instance, in the case of an electrospray ion source, the standard may be provided by an additional spray probe within the source. Alternatively, the standard may be provided in addition to samples of interest through a single electrospray probe using other means such as a valve or tee. Alternatively, the standard may comprise a background ion from the solvent that is continuously present, for instance from the solvent of an LC system. For some embodiments, monitoring the signal for a standard compound can involve ramping the DC potential applied to a lens or prefilter that is located between an ion guide and quadrupole mass analyzer. For these embodiments, the DC offset potential between the quadrupole and the ion guide can remain fixed, and the quadrupole Mathieu parameters can be fixed so that the signal optimization is other than due to adjustment of the quadrupole resolution.

Further understanding of various aspects of the present teachings can be obtained by reference to the following detailed description in conjunction with the associated drawings, which are described briefly below.

BRIEF DESCRIPTION OF THE DRAWINGS

FIG. 5A shows IQ1 ramping data obtained on the contaminated instrument. FIG. 5B depicts reserpine mass spectrum obtained after adjusting the IQ1 lens potential to the new optimum after 70 mL of contamination. And FIG. 5C depicts reserpine mass spectrum obtained after contaminating the system by infusing 70 mL of a tea/arugula extract without adjusting the IQ1 lens potential from the initial optimal value.

FIG. 9A shows voltage ramping data taken for a vertical steering lens element (VS1) after contaminating an instrument by spraying diluted olive oil for 110 hr. FIG. 9B shows optimal DC voltage settings for a vertical steering element (VS1) taken over the course of infusing olive oil for 110 hr. FIG. 9C shows optimal DC voltage settings for a horizontal steering element (HST) taken over the course of infusing olive oil for 110 hr. FIG. 9D shows optimal DC voltage settings for a slit lens (SL1) taken over the course of infusing olive oil for 110 hr. FIG.

9E shows optimal DC voltage settings for an additional lens element (FOR) taken over the course of infusing olive oil for 110 hr.

DETAILED DESCRIPTION

Figure 1:
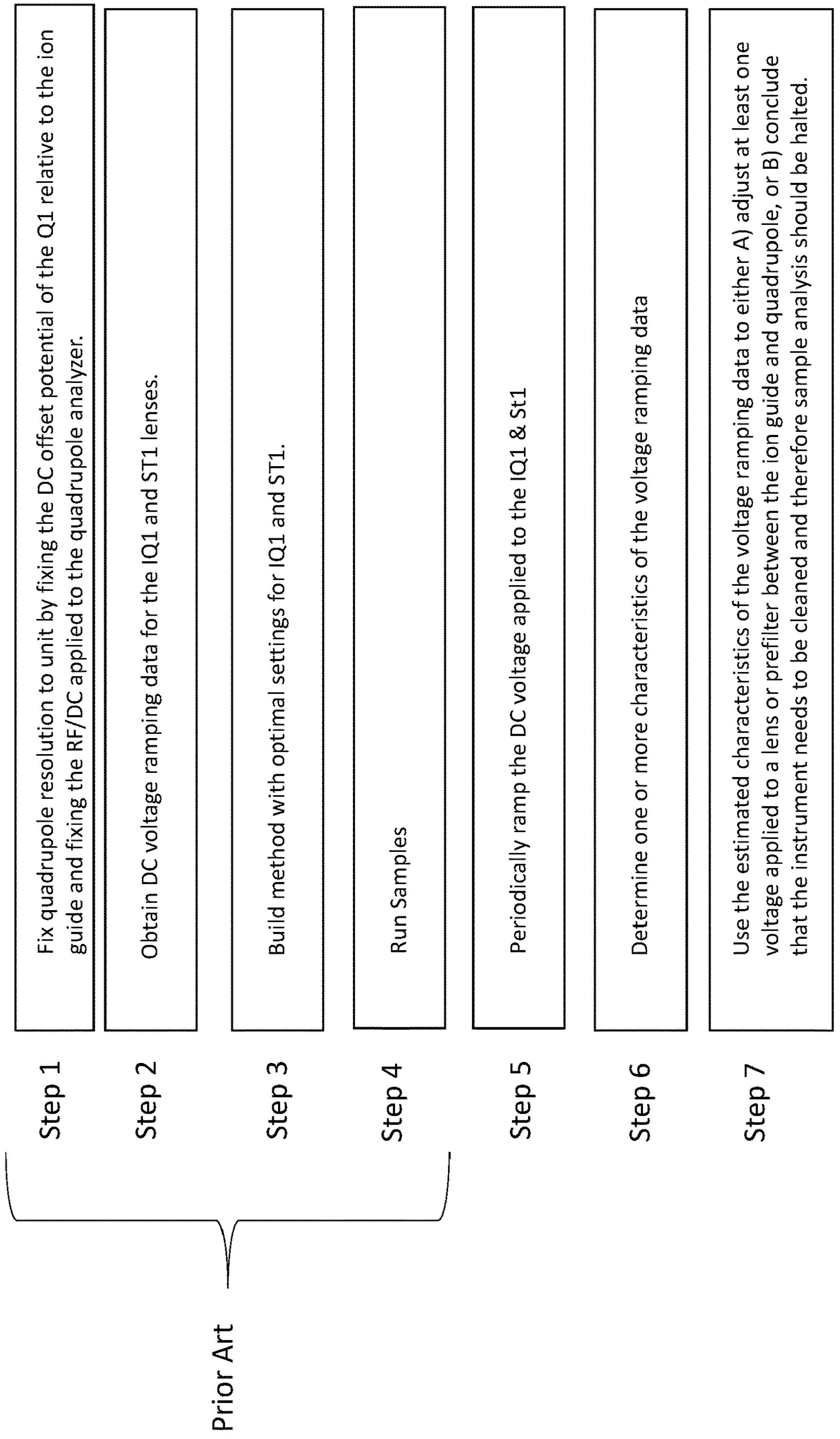
FIG. 1 is a flow chart depicting various steps in an embodiment of a method according to the present teachings for monitoring and optimizing the performance of a mass spectrometer, FIG. 2A schematically depicts a mass spectrometer in accordance with an embodiment of the present teachings, FIG. 2B schematically depicts an example of an implementation of an analyzer and/or a controller according to an embodiment of the present teachings.

The present teachings are generally related to methods and systems for monitoring and optimizing the performance of a mass spectrometer. As discussed below, in some embodiments, the methods and systems according to the present teachings provide automated assessment of performance of a mass spectrometer by periodically acquiring baseline performance data to assess ion transmission through the instrument. The assessment can be, for example, based on ion intensity. By way of example and as discussed in more detail below, for a quadrupole mass analyzer, a controller can monitor the peak intensity, or a DC voltage ramp applied to low potential lens elements located between a collisional cooling ion guide and a quadrupole analyzer, and adjust the DC voltage applied to one or more critical lens elements in this region so as to sustain the performance level of the spectrometer.

By way of example, for some quadrupole mass analyzers, lens elements that can be critical to optimize are those with a low potential difference relative to adjacent lenses. Some quadrupole mass spectrometers can include a collisional cooling ion guide (Q0) and a downstream mass analyzer (Q1) that receives ions from the ion guide. Typically, ion optics in the form of an ion lens (IQ1) and stubby lens (ST1) are positioned between the ion guide (Q0) and the mass analyzer (Q1). The deposition of charged debris in this region can have a large impact on the performance of the spectrometer. It has been discovered that by adjusting the voltages applied to these elements, e.g., in a periodic manner, a high level of instrument performance can be sustained over longer periods of time.

As discussed in more detail below, in some embodiments, an automated system for LC/MS analysis is provided that can periodically monitor the performance of the mass spectrometer by measuring one or more characteristics of mass spectrometer data acquired by infusing a secondary sample into the spectrometer or by relying on background ions inherently generated by the LC eluent. By way of example, the characteristics of the mass spectrometer data can correspond to the intensity of a signal, or the shape or maximum in voltage ramping data taken for lens elements located between an ion guide and a mass analyzing quadrupole. When the intensity of the mass peak deteriorates, a mass spectrum of a secondary sample or background ions can be acquired as one or more DC voltages applied to lens elements, e.g., IQ1 and Stubby (ST1), are ramped so as to assess the optimal values of voltage(s) for application to these lens elements. By way of example, the optimization of the applied voltage(s) can be achieved by maximizing ion transmission into Q1 or optimizing the peak intensity. In some embodiments, such optimization of the performance of the mass spectrometer can be achieved in a fully automated manner without any need for user intervention.

In the following description, various aspects of the present teachings are discussed in connection with a mass spectrometer having a quadrupole mass analyzer. But it should be understood that the present teachings can also be applicable to other mass spectrometric systems. By way of example, the present teachings can be applied to time-of-flight (ToF) mass analyzers where various steering potentials can affect the performance. Further, the present teachings can be employed to provide feedback regarding when cleaning of various elements of a mass spectrometer may be needed, e.g., when the accumulation of charged residues is occurring at an accelerated rate. Additionally, while in some embodiments the following description generally relates to the first mass analyzing quadrupole of a triple quadrupole system, these principles can also apply to the second mass analyzing quadrupole of a triple quadrupole system, where the collision cell can be treated as the ion guide, the second mass analyzing quadrupole as the quadrupole analyzer, and IQ3 and ST3 as the lens and prefilter for DC potential optimization.

Figure 3:
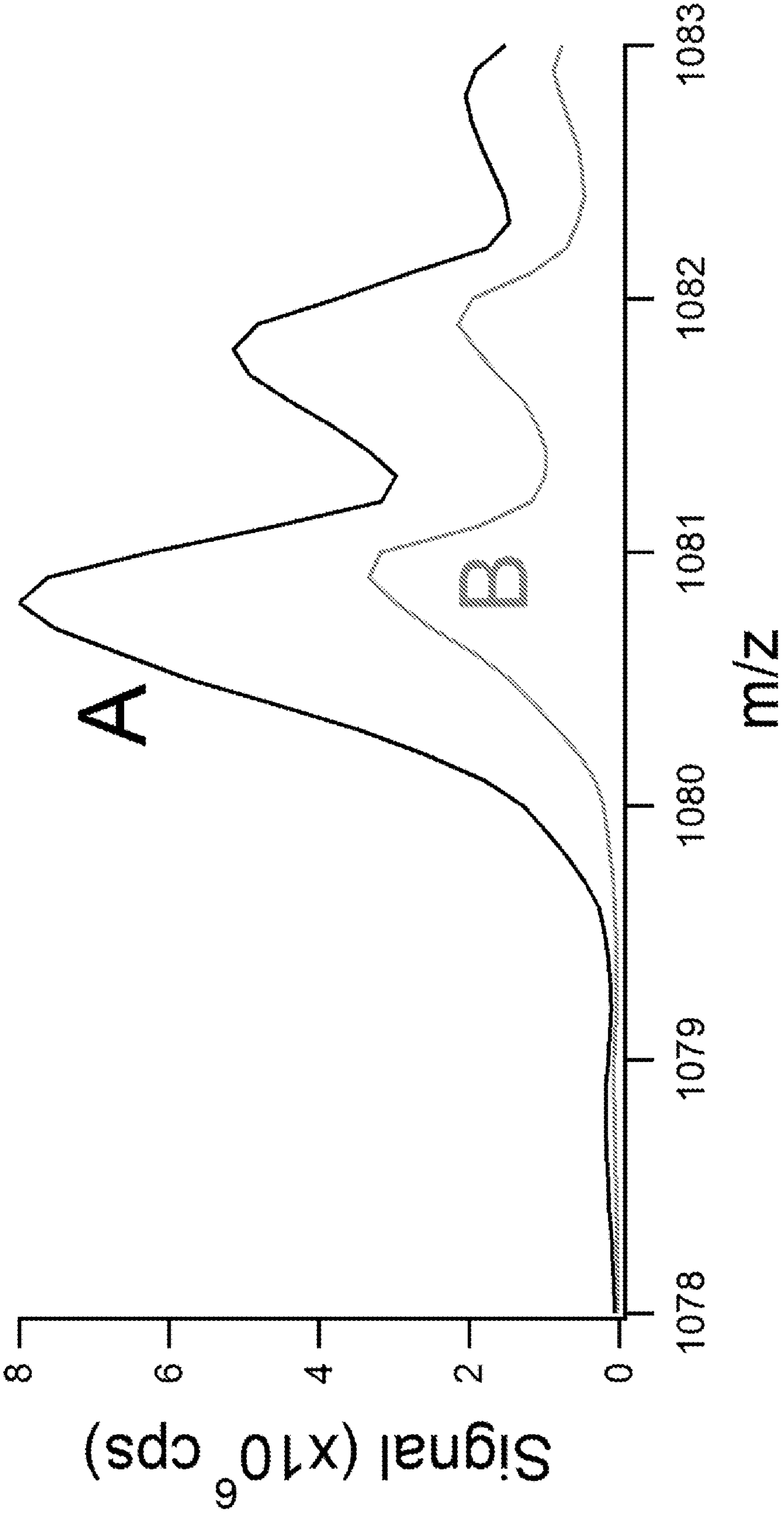
FIG. 3 shows mass spectra of PPG obtained using a mass spectrometer subjected to contamination at different energies of ions entering a mass analyzer of the spectrometer from an upstream ion guide.

FIG. 1 provides a flow chart, where steps 1-4 describe the prior art tuning approach for a quadrupole mass spectrometer. Quadrupole resolution is first set by providing a fixed DC offset potential between the ion guide and quadrupole analyzer, and then the RF and DC potentials applied to the quadrupole analyzer are adjusted. In this manner, the ion energy setting (IE1) for ions entering the quadrupole analyzer is fixed and quadrupole resolution remains constant. In steps 2-3, the optimal DC potentials are set for the IQ1 lens and prefilter ST1, prior to running samples (step 4). This workflow is generally known in the prior art. When quadrupole systems are operated under extreme contamination conditions, the quadrupole resolution may vary due to charging, commonly resulting in reduced sensitivity and over-resolved peaks. This condition can be remedied by either increasing the IE1 setting, or adjusting the RF/DC potentials on the quadrupole to lower resolution and thereby improving signal as shown in FIG. 3 for an ion from a PPG sample. In this case, the mass spectrometer was contaminated with a sample matrix comprising a mixture of tea and arugula, and the quadrupole resolution was adjusted by increasing the offset of the quadrupole from the collisional cooling ion guide (i.e. increasing the ion energy).

The inventors have discovered that quadrupole analyzer charging and subsequent over-resolving of peaks is not the only reason for signal reduction when exposing a quadrupole system to high contamination rates. Specifically, signal reduction may also be observed as a result of charging of the IQ1 and ST1 lens elements, with no change in the quadrupole resolution. Therefore, steps 5-7 of the flow chart in FIG. 1 illustrate that in one embodiment of the present teachings, the DC potentials applied to the IQ1 and/or ST1 lens elements can be periodically ramped while monitoring a mass signal for a standard compound (Step 5).

One or more characteristics of the voltage ramping data can be used to estimate the performance of the mass spectrometer (Step 6), and the estimated characteristics can be used to either adjust at least one voltage applied to the IQ1 or ST1 lens elements so as to enhance the performance of the mass spectrometer, or to conclude that the IQ1/ST1 region is substantially contaminated and the best course of action is to stop the analysis and clean the system. In some embodiments, the decision whether to adjust DC potentials or stop the analysis can be made based upon characteristics of the voltage ramping data such as the shape of the curves and/or the voltage for the optimal signal. For instance when running a clean SCIEX 5500 instrument, the IQ1 lens potential is commonly between −10.1 and −12 V. An IQ1 ramp plot with an optimal IQ1 potential more positive than −10 V could be used as a trigger to stop data acquisition.

In some embodiments, the characteristics of the mass spectrum utilized to monitor the performance of the mass spectrometer can be, for example, at least one parameter associated with a mass peak in the mass spectrum. By way of example, the parameter associated with the mass peak can be any of an intensity of the mass peak, an optimal potential in a voltage ramp, a general shape of a voltage ramp, or the ratio of signals generated at two or more different values on a voltage ramping curve.

In some embodiments, the step of adjusting the applied voltage can include ramping a voltage (e.g., a DC voltage) applied to a component of the mass spectrometer and monitoring the characteristics of the mass spectrum in response to the voltage ramp so as to identify an optimal voltage for application to that component, e.g., a lens element.

By way of example, a measured intensity of a mass peak that is below a predefined threshold can indicate a degradation in the performance of the mass spectrometer. In response to such measurements, the voltage applied to one or more components of the mass spectrometer can be adjusted to optimize the performance of the mass spectrometer. For example, the voltage can be ramped over a predefined range while the mass spectrum is acquired. The change of the characteristic of the mass peak (e.g., its intensity) in response to the voltage ramp can be monitored to identify the optimal voltage for application to that component. By way of example, the optimal voltage can be a voltage at which the peak intensity is maximized.

By way of example, in some embodiments, the mass spectrometer can include an LC (liquid chromatography) column for receiving a sample, and an ion source that is fluidly coupled to the LC column for receiving eluents from the LC column and generating ions. An ion guide that is configured to receive ions from the ion source, and a mass filter positioned downstream of the ion guide, a lens positioned between the ion guide and the mass filter and a prefilter positioned between the ion guide and the mass filter. In such an embodiment, the DC voltage offset between the ion guide and the mass filter is fixed to maintain a constant ion energy for ions arriving at the mass filter. The DC potential applied to the lens and prefilter may be periodically ramped to determine the optimal values for these lens elements and the optimal values from these ramps may be used to eliminate signal degradation. This can be done in an automated fashion to correct for any tuning differences that occur as a result of charging.

Figure 2A:
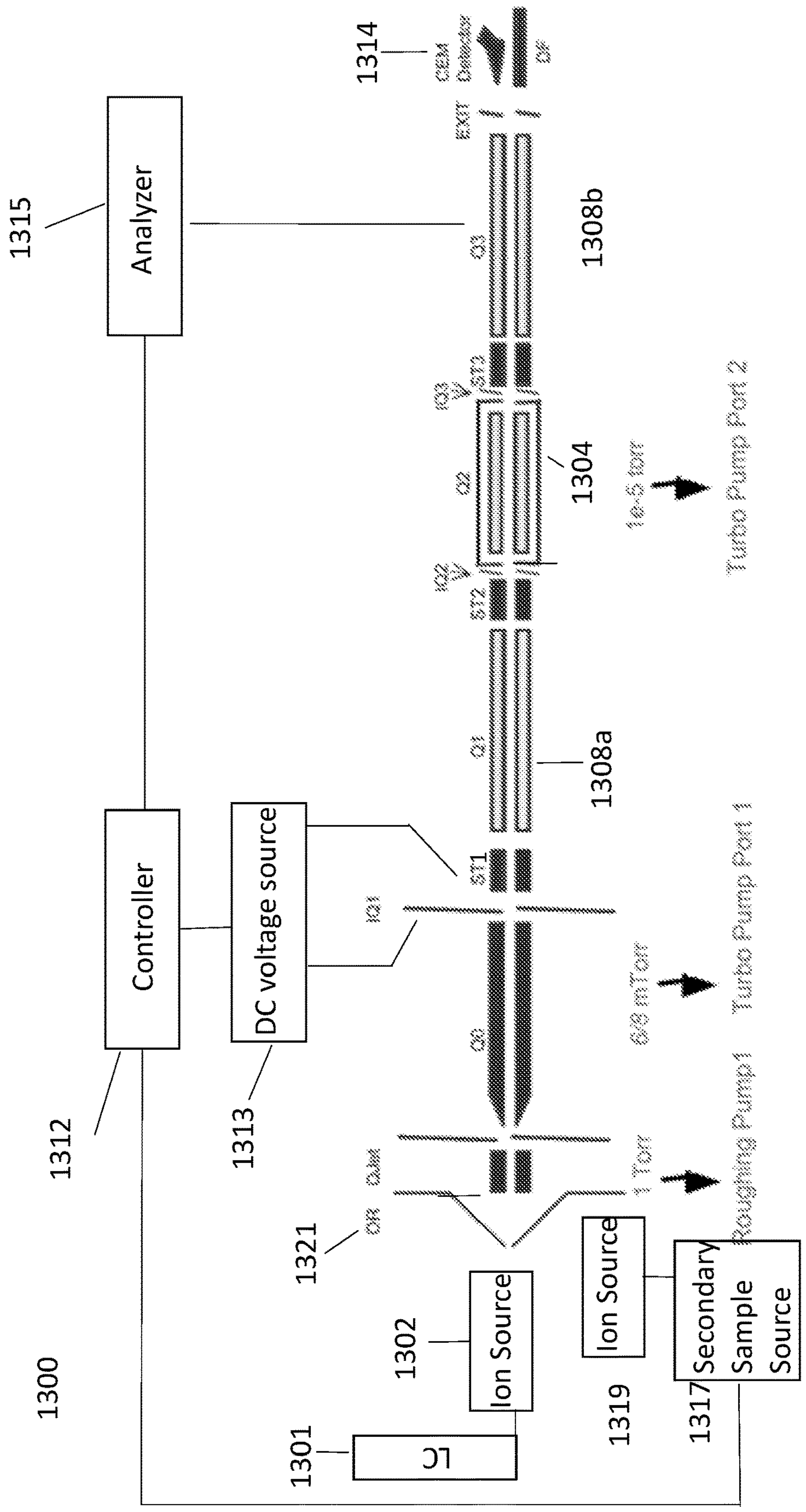

By way of example and with reference to FIG. 2A, a mass spectrometer 1300 according to an embodiment includes an LC column 1301 that can receive a sample and deliver an eluent to an ion source 1302 for generating ions. The ion source can be separated from the downstream section of the spectrometer by a curtain chamber (not shown) in which an orifice plate 1321 is disposed, which provides an orifice through which the ions generated by the ion source can enter the downstream section. In this embodiment, an RF ion guide (Q0) can be used to capture and focus the ions using a combination of gas dynamics and radio frequency fields. The ion guide (Q0) can also provide collisional cooling of the ions. The ion guide Q0 delivers the ions via a lens IQ1 and Brubaker lens ST1, e.g., approximately 2.35 cm long RF quadrupole, to a downstream quadrupole mass analyzer Q1, which can be situated in a vacuum chamber that can be evacuated to a pressure that can be maintained lower than that of the chamber in which RF ion guide Q0 is disposed. By way of non-limiting example, the vacuum chamber containing Q1 can be maintained at a pressure less than about $1\times10^{-4}$ Torr (e.g., about $2\times10^{-5}$ Torr), though other pressures can be used for this or for other purposes.

A DC voltage source 1313 operating under control of a controller 1312 can apply DC voltage(s) to the IQ1 lens and the Brubaker lens ST1 to adjust the trajectory of ions for entering the Q1 mass analyzer. As discussed in more detail below, the DC voltages applied to the IQ1 lens and/or the Brubaker lens ST1 can be adjusted in response to the measurement of one or more characteristics of a measured mass spectrum or an applied voltage ramp to optimize the performance of the mass spectrometer.

As will be appreciated by a person of skill in the art, the quadrupole rod set Q1 1308*a* can be operated as a conventional transmission RF/DC quadrupole mass filter that can be operated to select an ion type of interest and/or a range of ion types of interest. By way of example, the quadrupole rod set Q1 can be provided with RF/DC voltages suitable for operation in a mass-resolving mode. As should be appreciated, taking the physical and electrical properties of Q1 into account, parameters for an applied RF and DC voltage can be selected so that Q1 establishes a transmission window of chosen m/z ratios, such that these ions can traverse Q1 largely unperturbed. Ions having m/z ratios falling outside the window, however, do not attain stable trajectories within the quadrupole and can be prevented from traversing the quadrupole rod set Q1. It should be appreciated that this mode of operation is but one possible mode of operation for Q1. By way of example, in some embodiments, the quadrupole rod set Q1 is operated in RF mode thus acting as an ion guide for ions received from $Q_0$.

Ions passing through the quadrupole rod set Q1 can pass through the stubby ST2, also a Brubaker lens, and a lens IQ2 to enter a collision cell 1304 in which at least a portion of the ions can undergo fragmentation to generate ion fragments. In this embodiment, the DC voltage source 1313, or another DC voltage source, can apply a DC voltage to the lens IQ2 and/or stubby ST2. As discussed in more detail below, in some embodiments, the DC voltage(s) applied to the lens IQ2 and/or stubby ST2 can be adjusted in response to measured characteristics of a mass spectrum to optimize the performance of the mass spectrometer.

In this embodiment, the collision cell includes a quadrupole rod set, though other multi-pole rod sets or ion guides comprising ring electrodes can also be employed in other embodiments. An RF voltage source (not shown) operating under the control of the controller 1312 can apply RF voltages to the rods of the collision cell to radially confine ions within the collision cell. Further, in this embodiment, IQ2 and IQ3 lenses are disposed in proximity of the inlet and outlet ports of the collision cell. By applying DC voltages to the IQ2 and IQ3 lenses that are higher than the collision cell's rod offset, axial trapping of the ions can be achieved.

In some embodiments, the collision cell is maintained at a high pressure, e.g., at a pressure in a range of about 2 mTorr to about 15 mTorr, to ensure efficient cooling of ions contained therein. In other embodiments, the mass spectrometer may not include a collision cell.

With continued reference to FIG. 2A, an analyzer ion trap or a second quadrupole mass analyzer 1308*b* is positioned downstream of the collision cell 1304. In this embodiment, the analyzer ion trap 1308*b* includes a quadrupole rod set to which RF voltages can be applied to provide radial confinement of ions therein. In some embodiments, one or more electrodes can be positioned in the proximity of the input and/or output ports of the analyzer ion trap (not shown) to generate axial fields within the analyzer ion trap, e.g., via application of DC voltages to the electrodes, for axial confinement of the ions. The controller 1312 may also control DC voltage sources used to apply voltages to the IQ3 and ST3 lenses (not shown). The IQ3 and ST3 DC lens potentials may be used to optimize transmission of ions into the Q3 analyzer, in a similar fashion to the IQ1/ST1/Q1 configuration. The IQ3 and ST3 DC voltages may be ramped to determine optimal values and these values can be used to eliminate signal loss due to charging in this region. Throughout this document, where reference is made to ramping of the IQ1 and ST1 potentials to determine the optimal DC voltage for transmission into Q1, it will be understood that the teachings also relate to optimization of the IQ3 and ST3 for transmission into Q3.

A detector 1314 positioned downstream of the mass analyzer 1308 can detect ions released from the mass analyzer to generate mass detection signals. By way of example, in some embodiments, the detector 1314 can be a dual stage discrete dynode detector or other detectors known in the art.

An analyzer 1315 is in communication with the detector to receive mass data from the detector and to generate a mass spectrum.

In this embodiment, the controller 1312 periodically causes the infusion of a secondary sample from a secondary sample source 1317, which is in fluid communication with a second ion source 1319, into mass spectrometer so as to obtain a baseline mass spectrum.

The analyzer 1315 can analyze one or more characteristics of the mass spectral data. For example, the analyzer 1315 can determine the intensity and/or peak shape of at least one mass peak present in the mass spectrum. In some other embodiments, rather than employing a secondary sample, the controller can periodically run the mass spectrometer so as to obtain mass spectra of one or more background ions inherently generated in the LC eluent or infusion solvent. Again, the analyzer 1315 can then analyze the mass spectrum so as to determine one or more characteristics of at least one mass peak in the mass spectrum. Alternatively, the controller can ramp a DC voltage applied to lenses located between the ion guide Q0 and the quadrupole Q1 and then adjust the DC potential applied to these lens elements based upon the characteristics of the voltage ramps. FIG. 2A shows a lens IQ1 and a prefilter ST1 in the region between the ion guide and Q1, however, it will be apparent to those of skill in the art that other optics devices may be included in this region with or without the IQ1 lens and/or ST1. In some embodiments, the present teachings generally apply to monitoring and optimization of DC potentials applied to lens elements located between a quadrupole analyzer and a collisional focusing ion guide, in which the quadrupole ion energy is established by the DC voltage offset of the quadrupole from the ion guide.

The analyzer 1315 can determine, based on the measured characteristics of the mass spectrum, whether an adjustment of the DC voltage(s) applied to one or more lenses, e.g., the IQ1 and/or stubby lens ST1, is required. By way of example, the analyzer 1315 can compare an acquired spectrum with a calibration spectrum to determine whether an adjustment of the DC voltage(s) is required. For example, in some embodiments, if the analyzer 1315 determines that the intensity of a mass peak in the mass spectrum is less than a threshold value, an adjustment of the DC voltage(s) may be needed. Alternatively, the controller may ramp the DC potential applied to one or more lenses, e.g., the IQ1 and/or stubby lens ST1, monitor various characteristics such as the ramp shape and/or location of the optimal DC potential, and then make adjustments to these DC potentials to optimize the signal. Alternatively, if the maximum of the voltage ramp or the mass spectrum fall outside of a certain criteria range, the controller may halt the analysis or generate an error message to alert the operator that instrument cleaning is required.

If a voltage adjustment is required, the analyzer 1315 can communicate with the controller 1312 and the controller can ramp the DC voltage(s) applied to one or more of the lenses, e.g., IQ1 and/or stubby lens ST1. As the DC voltage(s) are ramped, mass spectra of the secondary sample acquired using any known scan function include MRM (multi reaction monitoring), or the ions inherent in the eluent, are acquired and analyzed by the analyzer to determine said characteristics of the mass peak or voltage ramp. The analyzer 1315 can then determine based on the measured characteristics of the mass peak or voltage ramp at different DC voltages applied to the one or more lenses, an optimal voltage for application to those lenses. By way of example, the optimal voltage can be a voltage at which the intensity of the mass peak is maximized. In other embodiments, alternatively or in addition, the DC voltage(s) applied to other lens elements, e.g., the IQ2 lens, IQ3 lens, or ST3 voltage can be adjusted so as to enhance the performance of the mass spectrometer.

By adjusting the DC voltages applied to the lenses, a high performance of the mass spectrometer can be sustained over longer periods of time. In other words, the present teachings advantageously allow automatic detection of a degradation in the performance of a mass spectrometer and its automatic amelioration to ensure that the mass spectrometer would perform at an optimal level. While in the above embodiments, the detection of a degradation in the performance of the mass spectrometer and its amelioration are performed automatically, in other embodiments, the present teachings can be implemented manually.

While in this embodiment, the analyzer 1315 and the controller 1312 are shown as two separate components, in other embodiments, the functionalities of the analyzer and the controller can be incorporated into a single component (which is herein referred to as a controller).

Figure 2B:
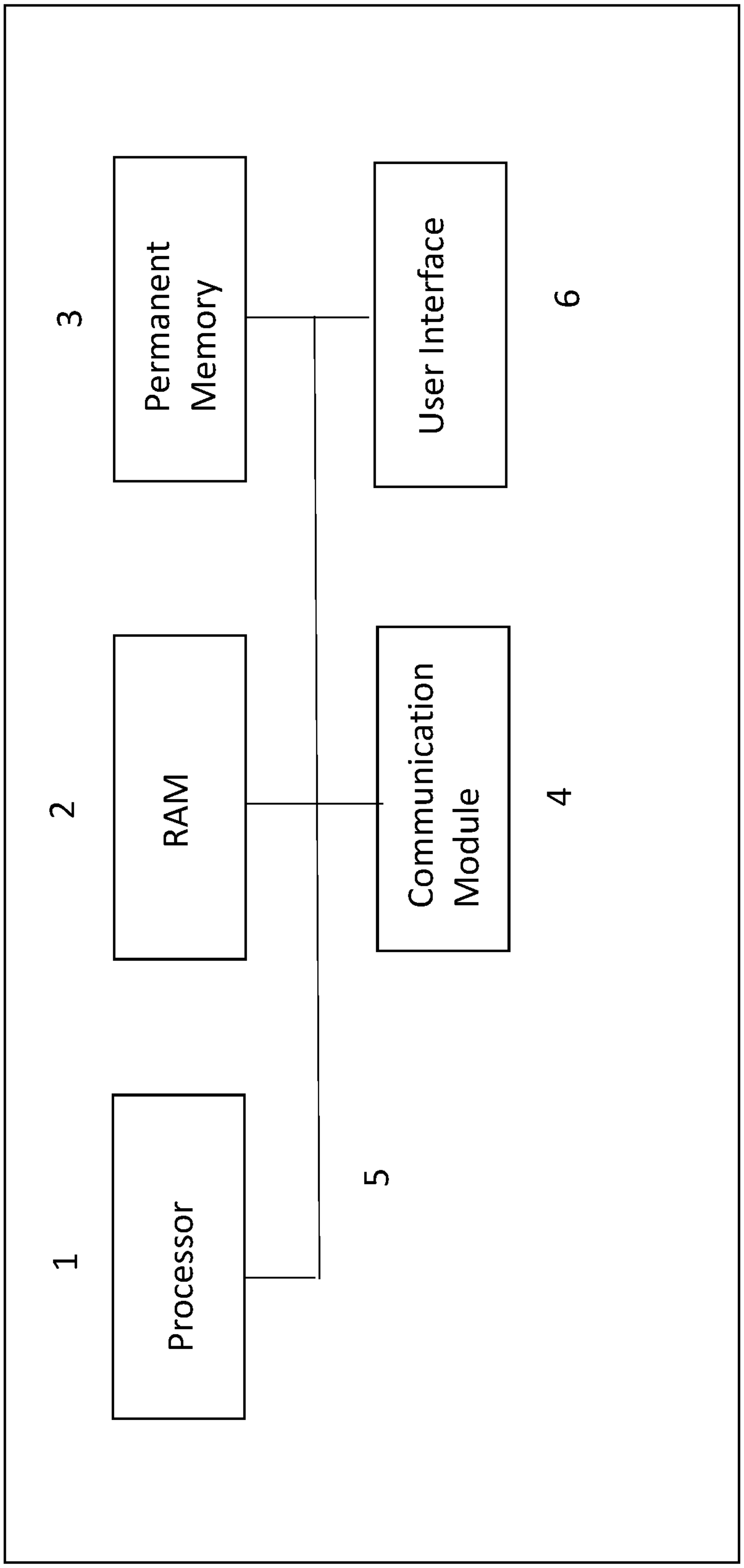

As known in the art and in view of the present teachings, the analyzer 1315 and the controller 1312 can be implemented in software, firmware and hardware. By way of example, FIG. 2B schematically depicts an example implementation of any of the analyzer 1315, where the analyzer includes a processor 1, at least one random memory module (RAM) 2, a permanent memory module 3, a communication interface 4 for communicating with the detector 1314 and the controller 1312, and a communication bus connecting the processor 1 with other components of the analyzer. A user interface 6 allows a user to interact with the analyzer, e.g., to program the analyzer and/or view the mass spectra generated by the analyzer. In some embodiments, the instructions for generating mass spectra from ion detection signals generated by the detector as well as instructions for determining whether an adjustment of one or more voltages applied to one or more components of the spectrometer is needed can be stored in the permanent memory module 3 and transferred to the RAM module 2 during runtime.

As noted above, the present teachings can be applied to a variety of different mass spectrometers, including, quadrupole, time-of-flight, hybrid quadrupole and triple quadrupole mass spectrometers.

The following examples are provided for further elucidation of various aspects of the present teachings, and are not necessarily indicative of the optimal ways of practicing the invention and/or optimal results that can be obtained.

Example 1

Highly accelerated contamination testing was conducted using a Sciex 5500 triple quadrupole mass spectrometer by infusing an arugula/tea matrix into the instrument. This approach can cause heavy instrument contamination within one week of sample infusion. The contamination manifests itself in the form of signal reduction and over-resolving of the Q1 data as shown in FIG. 3 for an ion from a PPG (polypropylene glycol) sample. The instrument was initially tuned with unit mass resolution and an ion energy setting of 0.7 eV, and then 55 mL of contamination matrix was sprayed over about a 1 week time period. After spraying 55 mL of contamination matrix, baseline PPG data were acquired with the unit resolution setting as shown in trace B in FIG. 3. After spraying the contamination matrix, the quadrupole mass analyzer was significantly over-resolving and the performance was poor. When the instrument was tuned back to unit mass resolution by either increasing the ion energy or adjusting the RF/DC levels on the quadrupole, the signal increased significantly. As noted above, trace B shows the intensity of the peak with the unit resolution setting after 55 mL of contamination while trace labeled A in FIG. 3 shows the signal for the same PPG ion when the ion energy was increased from 0.7 to 1.2 eV to reduce the resolution setting of the quadrupole analyzer.

While the above example describes tuning the resolution of the quadrupole mass analyzer on the mass spectrometer, it has been discovered that it is also possible to improve the performance of contaminated quadrupole mass analyzers by monitoring the DC voltage applied to the IQ1 lens and the ST1 lens (See, e.g., FIG. 2 above), rather than tuning the quadrupole resolution.

Example 2

Figure 4:
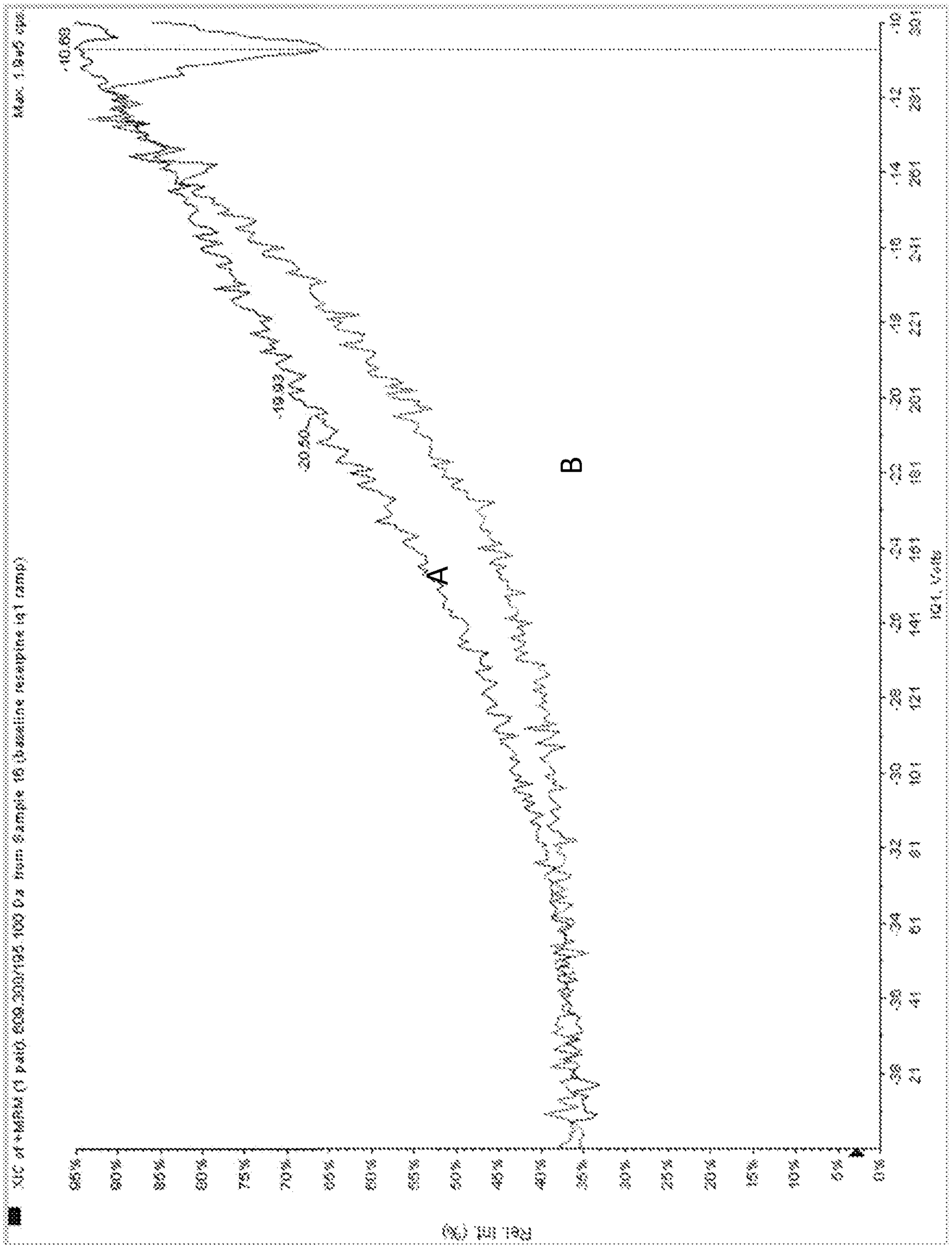
FIG. 4 shows DC voltage ramping data for an IQ1 lens taken before and after contamination of a mass spectrometer employed to obtain the data by spraying diluted olive oil for a period of approximately 120 hours.

FIG. 4 shows IQ1 voltage ramping data taken in accordance with one embodiment of the present teachings for a mass spectrometer that was subjected to infusion of 60 mL of an extract of tea and arugula. The effects of contamination of the IQ1 lens can be seen by comparing the IQ1 voltage ramps shown in FIG. 4, where the trace A is the original IQ1 voltage ramp prior to contaminating the instrument and the trace B is the IQ1 voltage ramp after the contamination experiment. Charging of material deposited on the IQ1 lens shifts the voltage to achieve maximum signal from a typical (uncontaminated value) of −10.5 V to a more negative value. The trace B shows that contamination of the IQ1 lens resulted in a local minimum in the signal in the vicinity of −10.5 V. In this case, the IQ1 voltage was varied from its initial (uncontaminated system) optimal value (trace A) to a new optimized value for the contaminated system (trace B). In this case, adjustment of the IQ1 lens potential to the new optimum determined by the voltage ramp resulted in about 25% signal increase. This example is complimentary to Example 1, because the quadrupole resolution was not affected by contamination in this case, so it was not possible to reduce quadrupole resolution to restore signal. The data show that as quadrupole mass spectrometers become contaminated, it is common for the shape of the IQ1 ramp profile to change such that the optimal value at the start of the analysis is different from the optimal value at the end of the analysis. Thus, it can be beneficial to monitor the IQ1 ramp profile change and adjust the voltage applied to IQ1 in order to obtain an optimal performance of the spectrometer. This approach can be applied to other lens elements as well, such as ST1.

Example 3

Figure 5A:
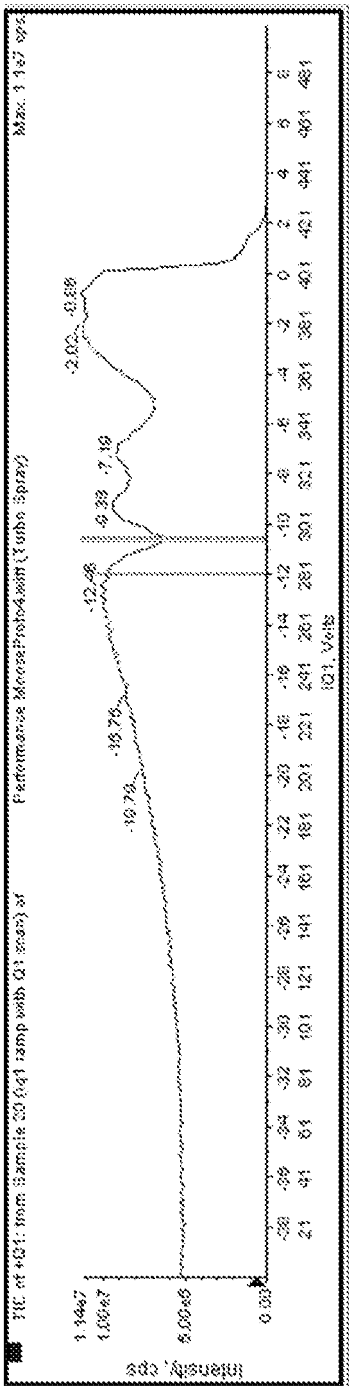
FIGS. 5A-5C show data obtained using a triple quadrupole mass spectrometer after contaminating the system by infusing 70 mL of a tea/arugula extract.
Figure 5B:
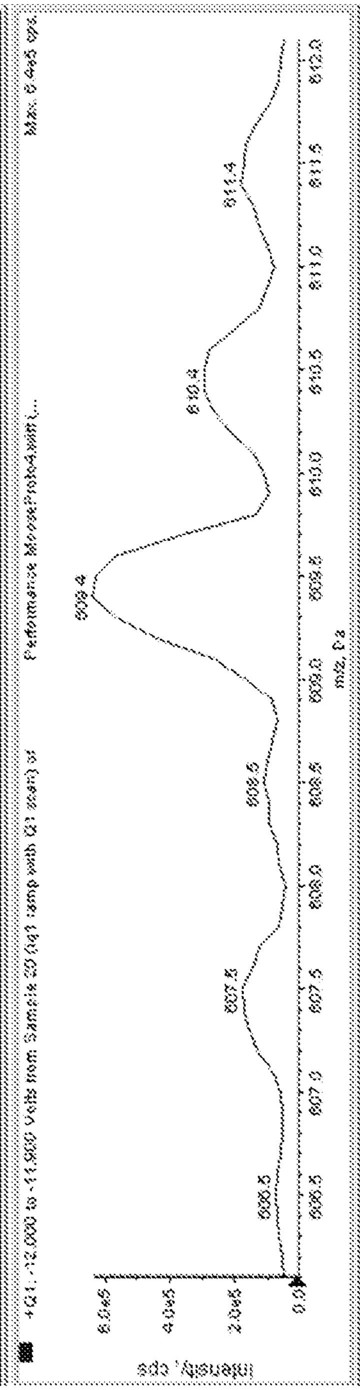
Figure 5C:
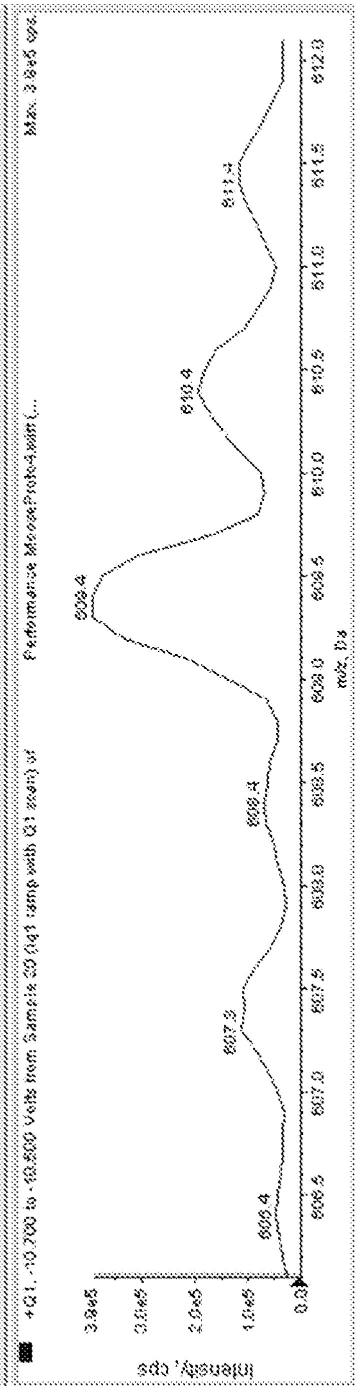

FIGS. 5A-5C show data acquired on a Sciex 5500 triple quadrupole mass spectrometer, demonstrating IQ1 voltage ramping data obtained on a system contaminated by infusing 70 mL of a tea/arugula extract. FIG. 5A shows IQ1 ramping data obtained on the contaminated instrument. The data are similar to that described in Example 2 in that charging of contaminating material in the IQ1 region caused a local minimum in the signal. FIG. 5C shows Q1 data acquired for reserpine ions using the original optimal IQ1 value of −10.5 V, and FIG. 5B shows Q1 data acquired after setting the IQ1 voltage to −12 V. The signal intensity increased from approximately 390,000 cps to 640,000 cps as a result of the adjustment to the IQ1 potential. The Q1 peak width was unaffected by the change in IQ1 voltage, confirming that the signal gain was not due to reducing the quadrupole resolution. On the contrary, the signal gain was due to optimization of the voltage applied to a low DC voltage lens element located between a collisional cooling ion guide (Q0) and a quadrupole analyzer (Q1).

Example 4

Figure 6:
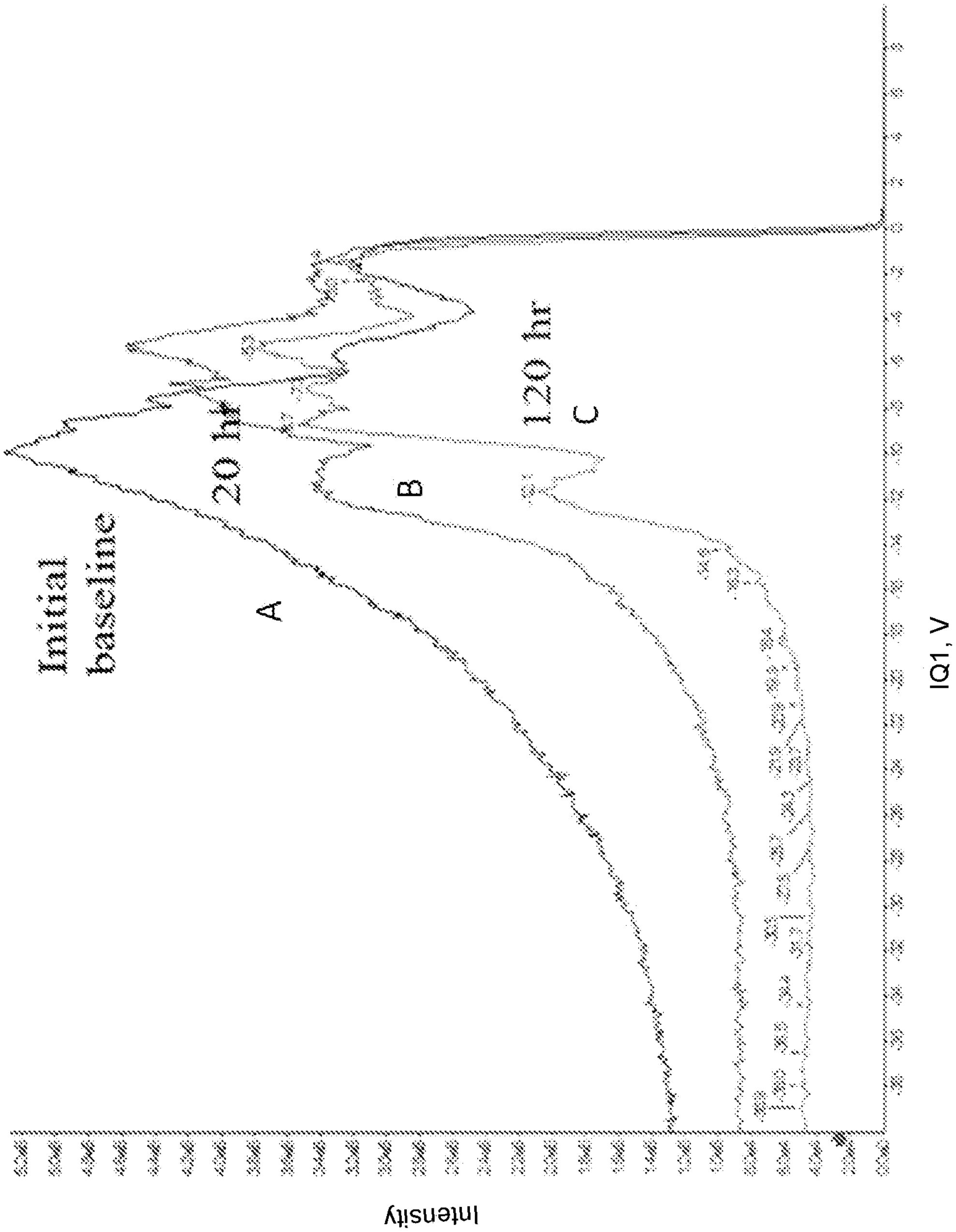
FIG. 6 shows IQ1 ramping data obtained on a triple quadrupole instrument that had been contaminated by spraying diluted olive oil for 120 hrs.

Under conditions of extreme contamination in the IQ1 region, further changes to the IQ1 voltage ramp shape may occur. FIG. 6 shows an example of 3 IQ1 voltage ramps taken on a Sciex 6500 triple quadrupole system while infusing a contamination solution comprising diluted olive oil. The trace A shows the initial IQ1 voltage ramp acquired as a baseline prior to infusing contamination solution. After 20 hrs of infusing contamination solution, an additional IQ1 ramp was taken as shown by the trace B, where the optimal value has shifted from the initial location. The maximum signal was down relative to the initial baseline data and the total signal drop represents the cumulative effects of contamination of the entire ion path. Generally when tuning the IQ1 voltage, it is desirable to set a voltage value that is <−10 V, to eliminate the detrimental effects of trapping in the IQ1 region. Despite the slightly higher signal by operating at −4 V, it would be undesirable to operate at this voltage. A controller as described in the embodiments of this disclosure would adjust the IQ1 voltage to −11.5 V as that would provide the greatest signal intensity for an IQ1 value more positive than −10 V.

For this experiment, the contamination matrix was infused for 120 hrs, resulting in the IQ1 ramp shown in the trace C. Severe charging of the IQ1 region resulted in an IQ1 voltage ramp where the signal was dramatically higher for settings that were more positive than −10 V. In this case, the controller as described in this embodiment would select −12 V for the IQ1 voltage. However, it is apparent from the strange shape of the IQ1 ramp that charging effects are quite severe. In this case, the analyzer may use the controller to stop analysis and indicate to the operator that the system should be cleaned. The criteria for determining that the analysis should stop can include a combination of characteristics from the IQ1 ramping data. For instance, one characteristic might be the IQ1 voltage that gives maximum signal; if this value is more positive than −10 V, additional characteristics can be used to make the stop/continue decision. The additional characteristics can include the ratio of maximum signal with the IQ1 voltage set more positive than −10 V to the maximum signal with the IQ1 voltage set more negative than −10 V; various ratios can be used to define a stop criteria, such as ratios greater than 1.5 for example. Other stop criteria can include comparison of the maximum signal obtained with the IQ1 voltage set more negative than −10 V to a reference value.

Example 5

Figure 7:
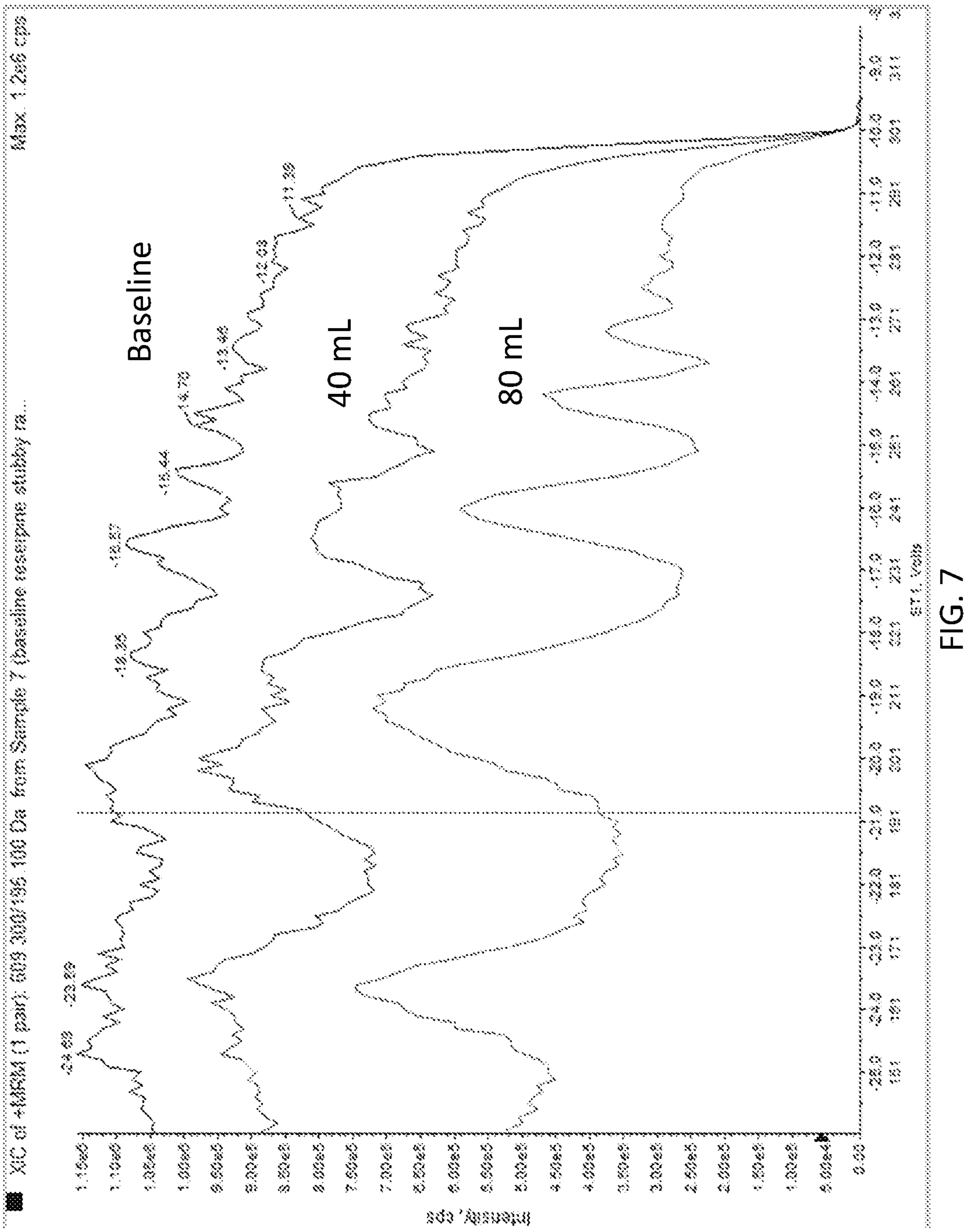
FIG. 7 shows prefilter ramping data obtained on a triple quadrupole instrument that had been contaminated by spraying 80 mL of an extraction of tea and arugula, FIG. 8 schematically depicts a hydrid quadrupole-time-of-flight mass spectrometer to which the present teachings can be applied.

FIG. 7 shows data acquired for 3 experiments where the ST1 DC voltage was ramped rather than the IQ1 voltage. For this experiment, a SCIEX 6500+ series triple quadrupole mass spectrometer was contaminated with an extract of tea/arugula. A total of 80 mL of the contamination matrix was infused over the course of 8 days and the shape of the ST1 DC voltage ramp was recorded daily. The baseline ST1 voltage ramp is shown in the top trace, where the general profile is relatively flat from −17 to −24 V. The contamination experiment used −21 V as a typical default value. The middle trace shows ST1 DC voltage ramping data taken after infusing 40 mL of matrix. The overall profile is less flat (i.e. there are larger peaks and valleys in the trace), and significant signal improvement is possible by shifting the ST1 value from −21 to −20 V. Finally, the bottom trace shows the ST1 DC voltage ramping method after 80 mL of matrix. In this case, the profile is even less flat, and the initial setting of −21 V is now a local minimum. Ramping the ST1 DC voltage and retuning it at the end of this experiment increased the signal from about 350,000 cps to about 750,000 cps. In this case, the quadrupole resolution was fixed for all experiments, and no adjustments were made to the ion energy or the Mathieu parameters.

From the data plotted in FIG. 7, it is apparent that charging in the ST1 region can lead to a shifting of the DC potential for signal optimization, but it can also lead to less flat voltage ramps. Therefore, the relative intensities for peak and valleys in the voltage ramping data can provide information about the extent of charging in the ST1 region. As described above in various embodiments of the present teachings, the ratio of peak/valley can also define one or more characteristics of the voltage ramping data. For instance, when the ratio of peak/valley exceeds 1.5 or 2, the analyzer can cause the controller to stop the analysis and trigger a message to the operator that the instrument is heavily contaminated and should be cleaned.

Example 6

Figure 8:
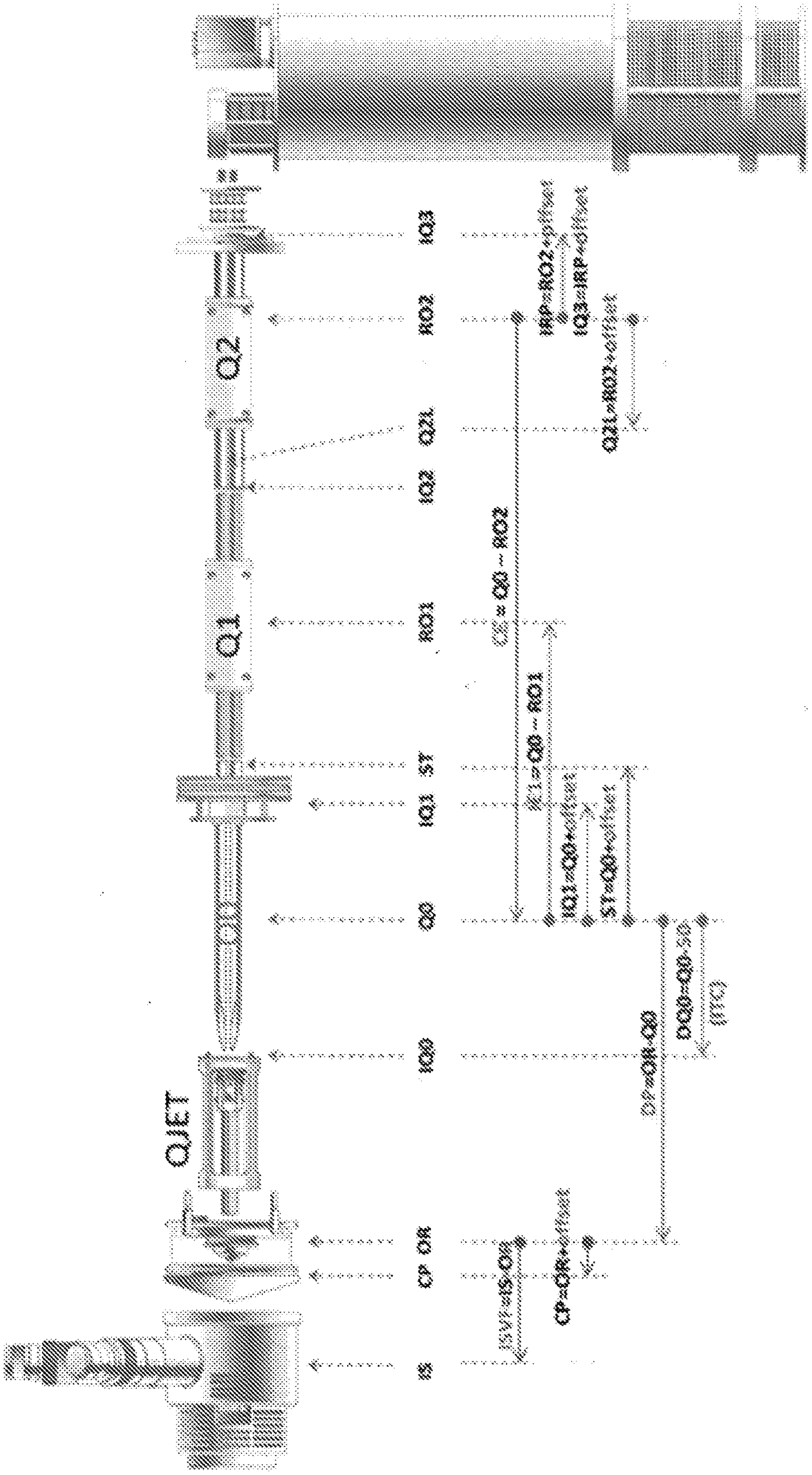

The present teachings for optimizing the performance of a mass spectrometer can be applied to a variety of mass analyzers, such as time-of-flight mass analyzers. By way of example, FIG. 8 schematically depicts a hybrid quadrupole-time-of-flight mass spectrometer (ToF) 800 in which ions, after passing through a QJET region, a Q0 region, and a quadrupole mass analyzer (Q1), arrive in a collision cell (Q2). In this embodiment, the Q2 region has a background gas pressure that is sufficient to provide collisional cooling of the ions, analogous to Q0. Ions are collisionally cooled, then pass through a series of lens elements with low DC potential offsets prior to arriving at the mass analyzing ToF.

In the case of the 6600 ToF system from SCIEX, the lens elements include the IQ3 lens at the back of the collision cell, a horizontal steering element, a vertical steering element, the FOR lens, and a slit lens. A DC potential is applied to each of these lens elements in order to optimize ion transmission into the mass analyzing ToF. As contamination accumulates in this region, the DC potentials necessary to optimize transmission can change.

Figure 9A:
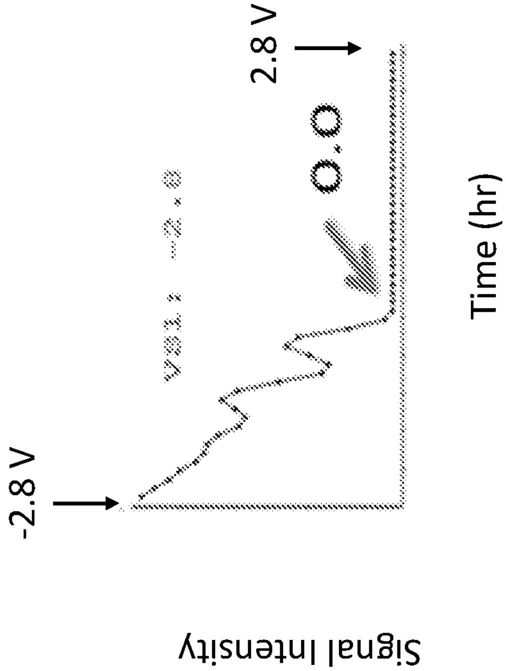
FIGS. 9A-9E show tuning data obtained on a 6600 Sciex instrument during a highly accelerated contamination test where diluted olive oil was sprayed for 110 hrs (flow rate 10 μL/min) into the instrument.
Figure 9B:
Figure 9C:
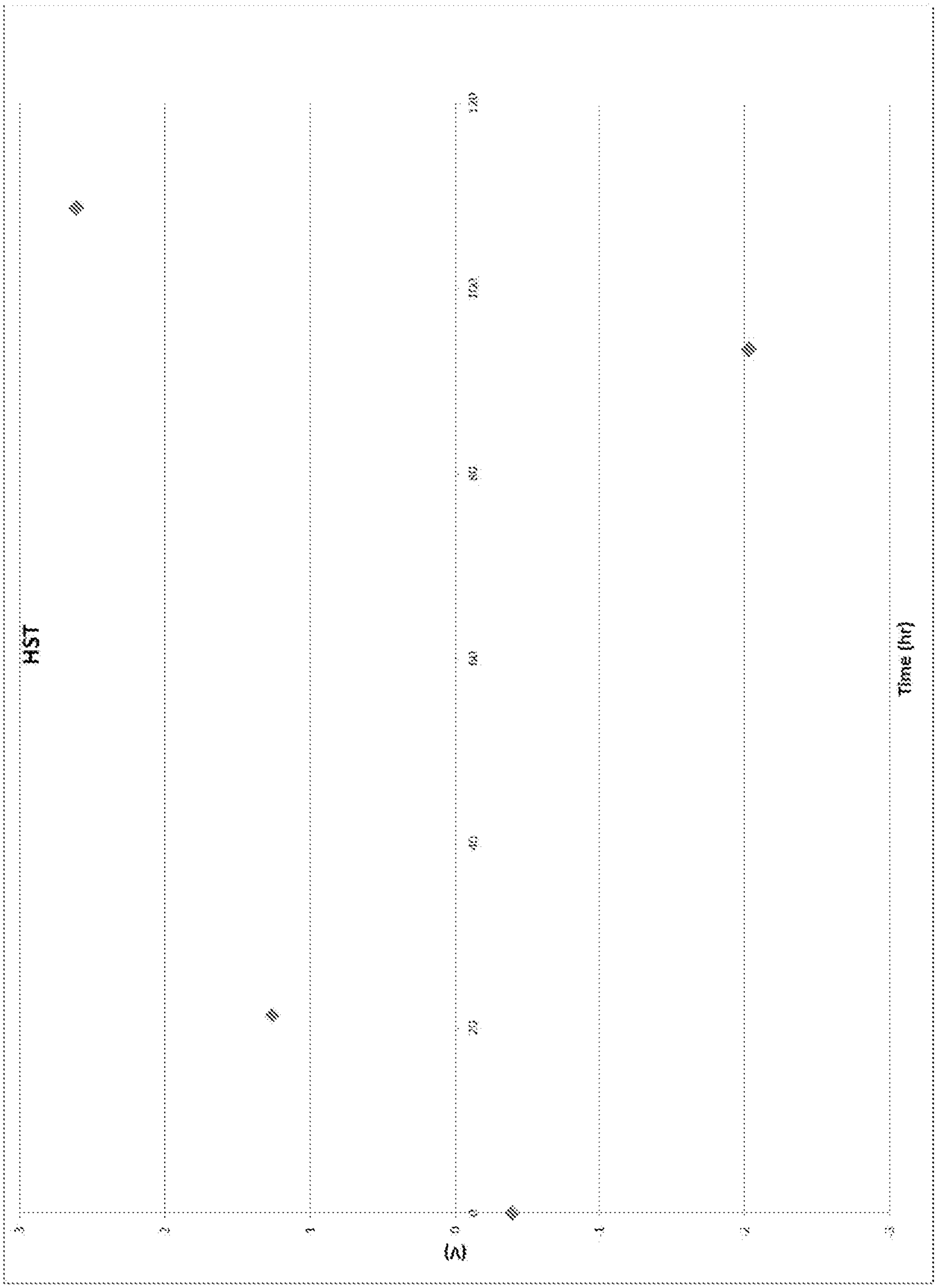
Figure 9D:
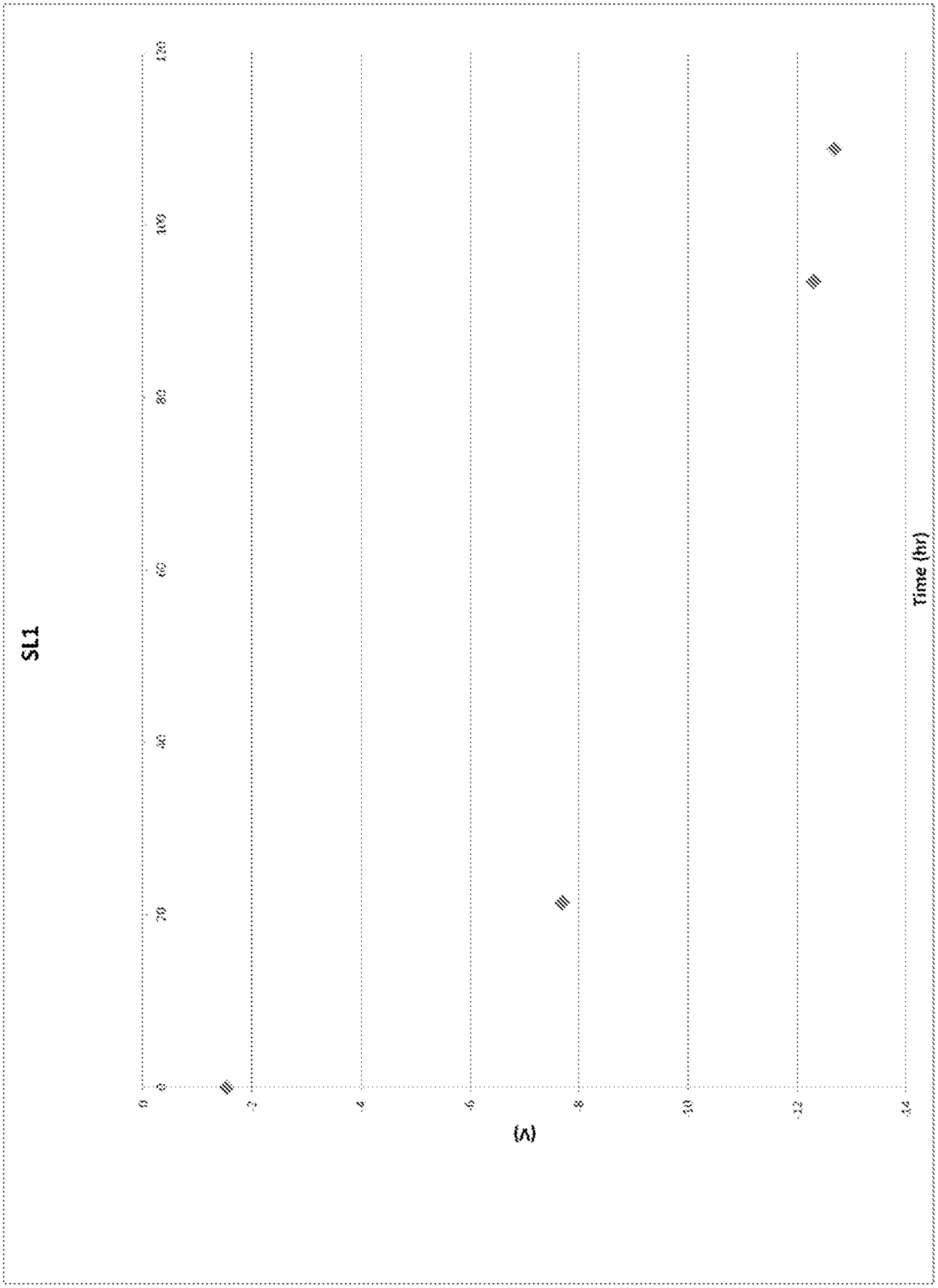
Figure 9E:
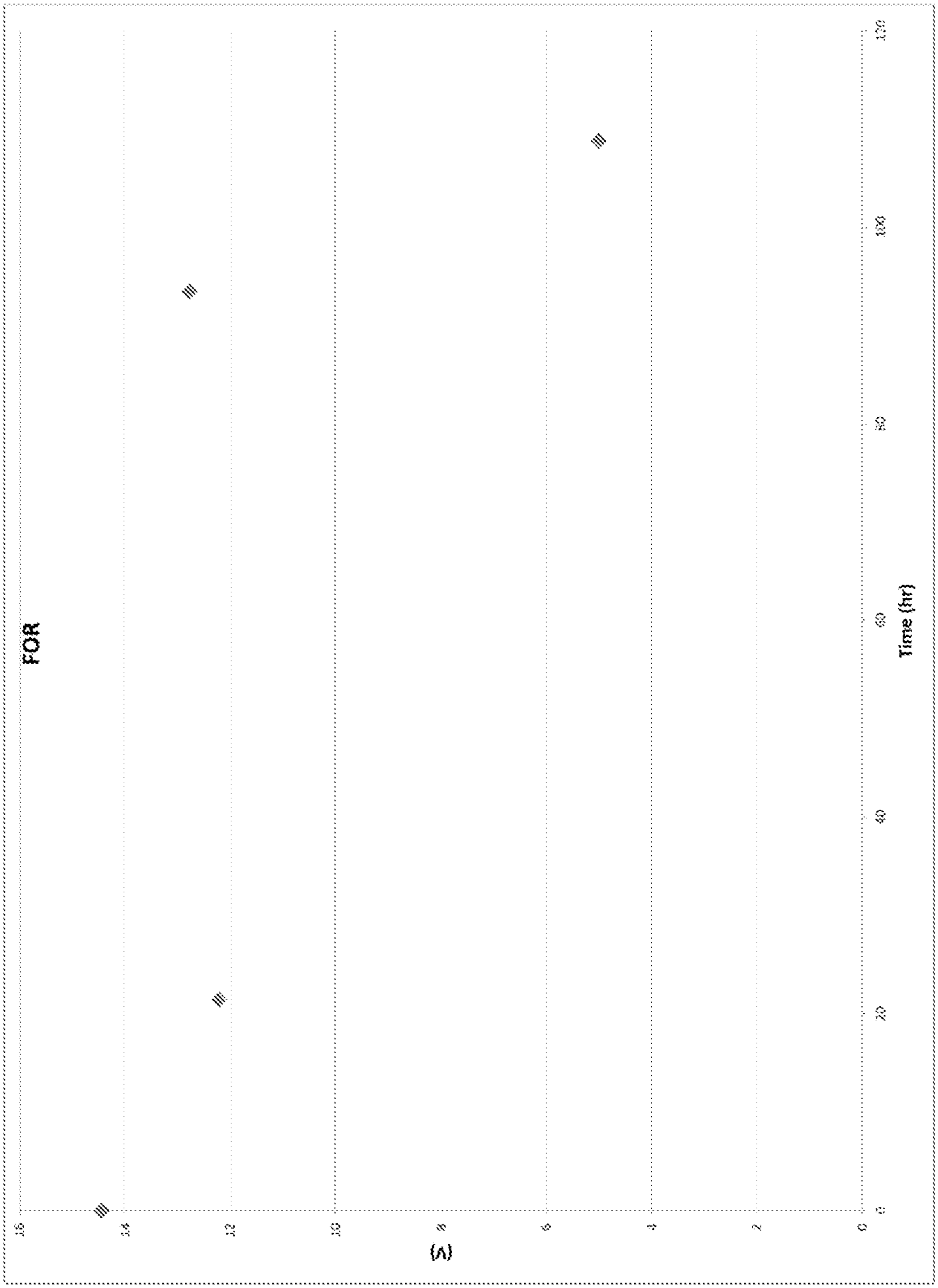

By way of example, FIGS. 9A-9E show tuning data obtained on a 6600 Sciex instrument during a highly accelerated contamination test where diluted olive oil was sprayed for 110 hrs (flow rate 10 μL/min) into the instrument. In the case of the vertical steering (controlled by parameter VS1) and the horizontal steering (controlled by parameter HST), it is common for optimal values to be close to 0 V when the instrument is clean. In these experiments, the x-axis represents time (units are hrs). The initial VS1 value was −1.5 V, and there was a general deviation towards more negative values over time as the system became more contaminated. The VS1 voltage ramp after 110 hrs is shown in FIG. 9A (range −2.8 V to +2.8 V). The signal intensity (y-axis) increased to the most negative value tested (−2.8 V). In this case, a stop criteria could be defined as either a ramp that provides the optimal signal with a value more negative than −3 V, or by comparing signal levels for the desired value (0.0 V) to that at the optimum (in this case −2.8 V). Alternatively, other stop criteria may be used such as signal optimizing with a value more negative than −5 V.

In this example, the potentials applied to the vertical steering element (VS1), horizontal steering element (HST), FOR lens element (FOR) and slit (SL1) were ramped and optimized at the start and end of the experiment, and twice during the highly accelerated robustness test. In the case of the HST, the initial optimum was close to 0 V, and as the system became contaminated it shifted significantly from 0 V (final value was around 2.7 V). The potentials applied to the slit (SL1 parameter) and FOR lens also shifted significantly from their initial optimal values. The present teachings provide a means to monitor for these changing optimal values, adjust the DC potentials between the Q2 and ToF regions, and define stop criteria for when the optimal values deviate too far from the initial values.

Figure 10:
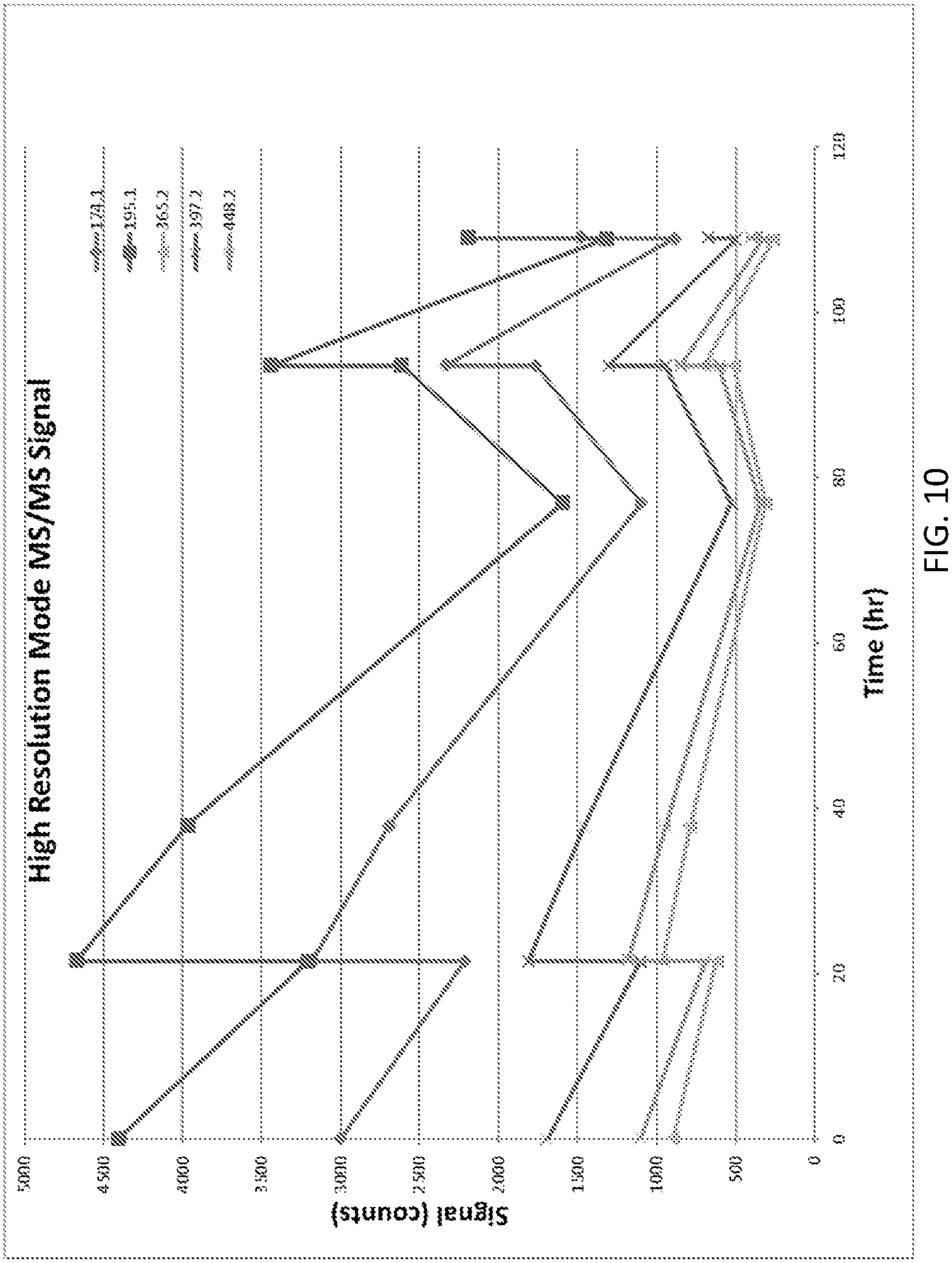
FIG. 10 shows data indicating that periodic ramping and optimization of DC potentials applied to lens elements located between a collision cell and time-of-flight analyzer can help maintain signal levels for a longer time period on a ToF analyzer.

One benefit of this approach is shown in FIG. 10, which depicts signal intensity data collected for ions with 5 different m/z values, relative to an initial starting signal. These data were collected during the lipid infusion experiment discussed above in connection with FIGS. 9A-9E. The signal for the 5 ions decreased significantly after 20 hrs of infusion of contamination matrix. After approximately 20 hrs of lipid infusion, the DC potentials applied to VS1, HST, FOR, and SL1 were ramped to determine the new optimum values shown in FIGS. 9B-9E. The controller set those new optimum values, and the signal intensity increased for each of the ions. For instance, the signal for m/z 195 increased from about 3200 counts to about 4700 counts. The DC potential applied to these lens elements was maintained constant until about time 90 hrs. At this point, additional potential ramps were conducted and the DC potentials applied to the VS1, HST, FOR, and SL1 were reoptimized, resulting in an additional signal improvement. Signal intensity continued to degrade with infusion of the lipid solution until about 110 hrs, when the DC potentials were again ramped and reoptimized. The data presented in FIG. 10 show that periodic ramping and optimization of the DC potentials applied to lens elements located between a collision cell and time-of-flight analyzer can help maintain signal levels for a longer time period on a ToF analyzer.

Those skilled in the art will know or be able to ascertain using no more than routine experimentation, many equivalents to the embodiments and practices described herein. Accordingly, it will be understood that the invention is not to be limited to the embodiments disclosed herein, but is to be understood from the following claims, which are to be interpreted as broadly as allowed under the law.

What is claimed is:

1. A method for optimizing performance of a mass spectrometer, comprising:

using an ion source to generate ions, collisionally cooling said ions within an ion guide, directing said ions from the ion guide through at least one ion lens to a downstream mass analyzer, ramping a DC voltage applied to said ion lens, performing mass analysis of said ions within said mass analyzer while the DC voltage applied to the ion lens is ramped, estimating performance of the mass spectrometer by measuring one or more characteristics of at least one of an ion signal and the voltage ramp in response to ramping of the DC voltage, adjusting a DC voltage applied to said at least one lens element based on said measured one or more characteristics of the at least one of an ion intensity signal and said voltage ramp so as to enhance performance of the mass spectrometer.

2. The method of claim 1, wherein said one or more characteristic is a characteristic other than resolution of said mass analyzer.

3. The method of claim 1, wherein said mass analyzer comprises a quadrupole mass analyzer.

4. The method of claim 1, further comprising applying a fixed DC voltage offset between the mass analyzer and the ion guide so as to maintain a fixed ion energy for ions entering said mass analyzer.

5. The method of claim 1, wherein the voltage is ramped over about 50 volts.

6. The method of claim 1, wherein said mass spectrometer comprises a hybrid quadrupole-time-of-flight mass analyzer.

7. The method of claim 1, wherein said ion signal comprises an intensity of an MRM transition.

8. The method of claim 1, wherein said ion signal comprises an intensity of a mass peak in a mass spectrum.

9. The method of claim 1, wherein said one or more characteristics of the voltage ramp comprises a ratio of an ion signal intensity at two voltages along said voltage ramp.

10. A mass spectrometer, comprising:

at least one ion source for generating ions, an ion guide for collisionally cooling said ions, at least one mass analyzer positioned downstream of said ion guide for performing mass analysis on said collisionally cooled ions, at least one lens element located between the ion guide and the mass analyzer, at least one DC voltage source for applying a DC voltage to said lens element, a controller in communication with said voltage source for ramping a DC voltage applied to said lens element, a detector positioned downstream of said mass analyzer for detecting ions passing through said mass analyzer and generating mass detection signals as the DC voltage is ramped, an analyzer in communication with said detector for receiving said mass detection signals from said detector and generating a mass ion signal, said analyzer being configured to extract one or more characteristics of any of said mass ion signal and said voltage ramp, said analyzer being in communication with said controller to provide control signals thereto for adjusting a DC voltage applied to said lens element based on said one or more characteristics of the ion signal and the voltage ramp.

11. The mass spectrometer of claim 10, wherein said one or more characteristics of said ion signal comprises an intensity of said ion signal.

12. The mass spectrometer of claim 10, wherein said ion signal comprises an intensity signal associated with an MRM transition.

13. The mass spectrometer of claim 10, wherein said one or more characteristics of said voltage ramp comprises a ratio of an intensity of an ion signal at two voltages along said ramp.

14. The mass spectrometer of claim 10, wherein said one or more characteristics of said voltage ramp comprises a maximum voltage at which an optimal ion signal is achieved.

15. The mass spectrometer of claim 13, wherein said mass analyzer comprises a quadrupole mass analyzer.

16. The mass spectrometer of claim 13, wherein said mass analyzer comprises a hybrid quadrupole-time-of-flight mass analyzer.

17. The mass spectrometer of claim 10, wherein said at least one DC voltage source is configured to apply a fixed DC voltage to at least one of said ion guide or said mass analyzer so as to maintain a fixed ion energy for ions entering the quadrupole mass analyzer.

* * * * *